Oct. 13, 1970  J. A. SMART  3,534,328
SWITCH FOR SPLIT-BRAKE SYSTEM
Filed May 19, 1966  2 Sheets-Sheet 1
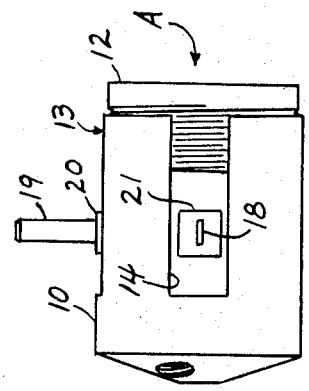
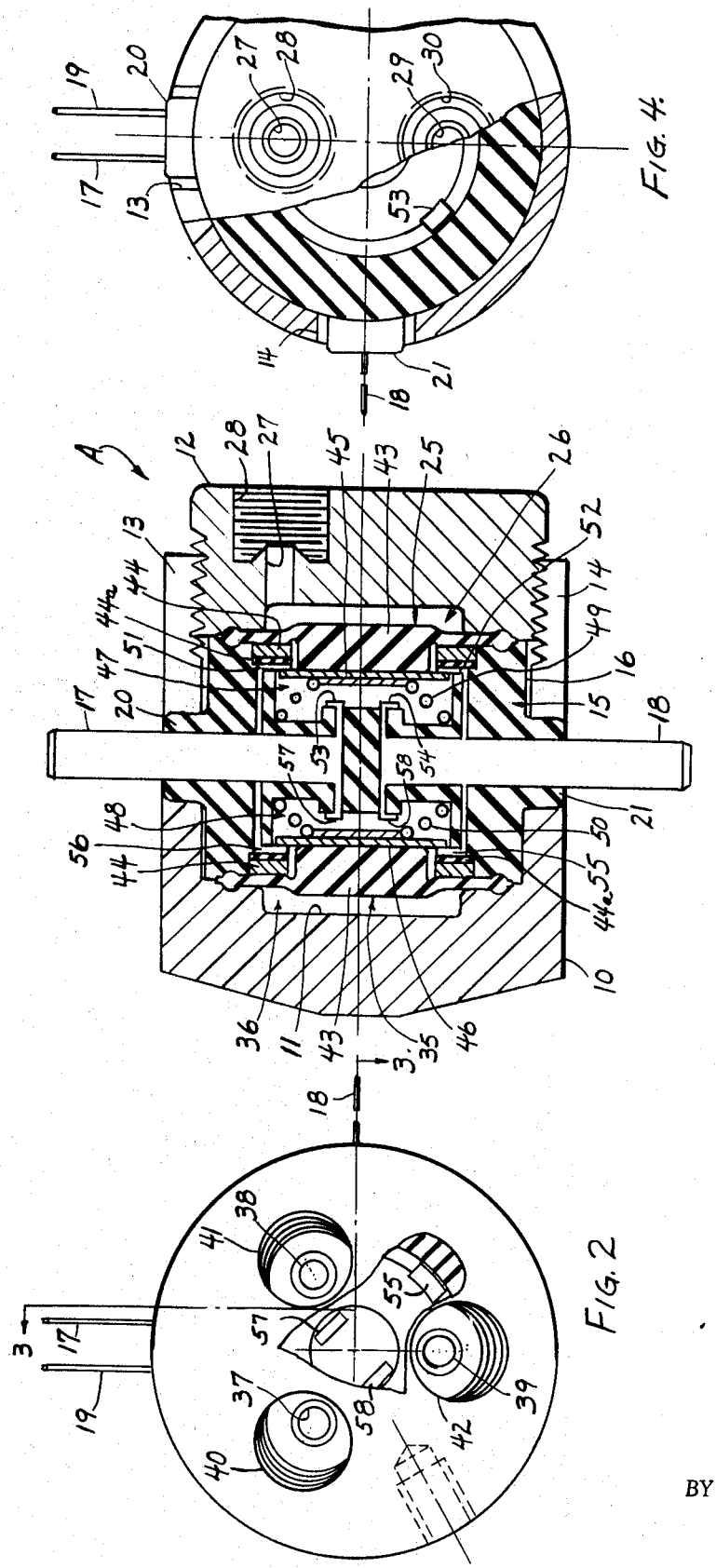
INVENTOR.
JACK A. SMART
BY
IRVIN L. GROH
ATTORNEY

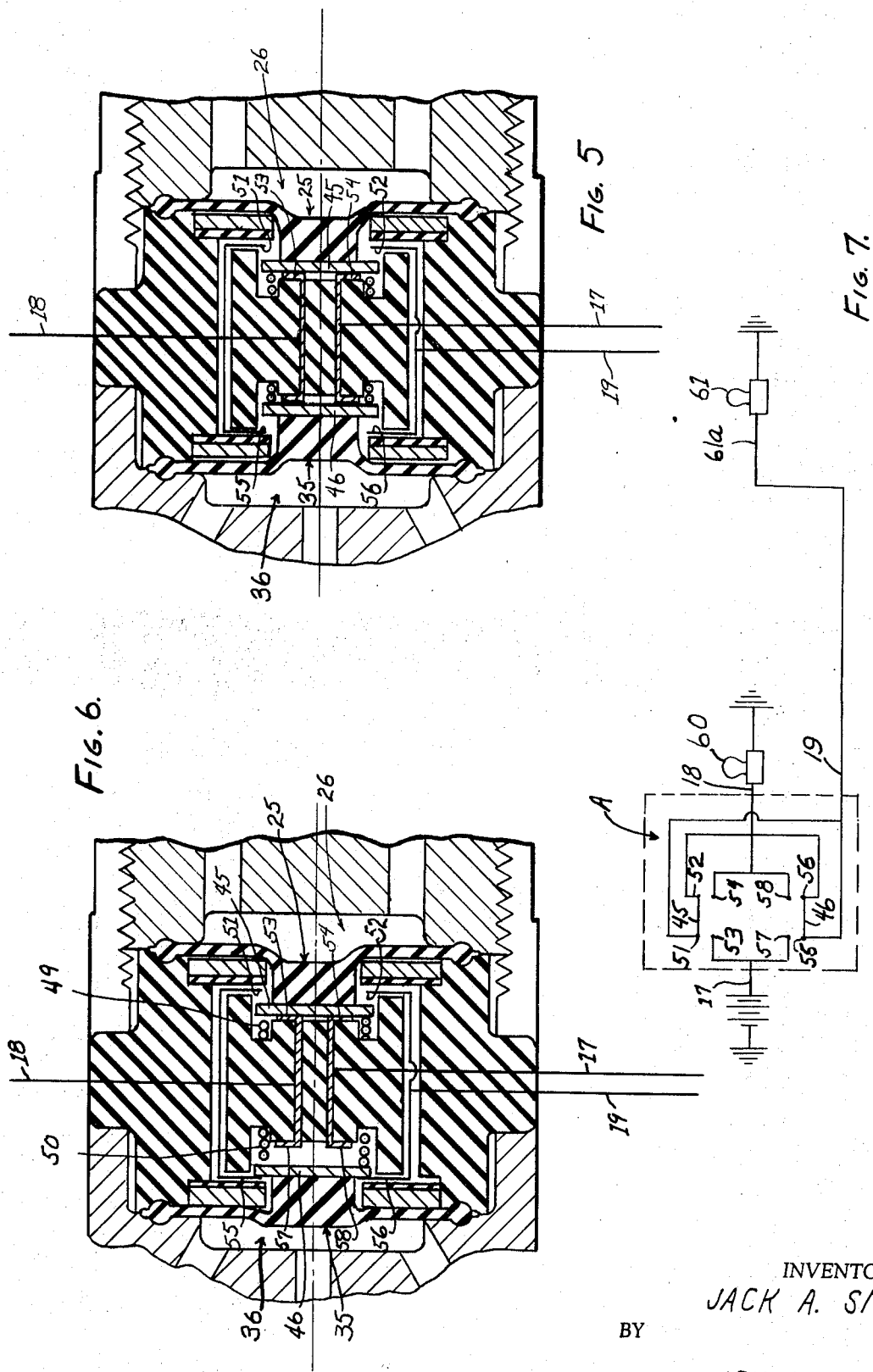

United States Patent Office 3,534,328
Patented Oct. 13, 1970

3,534,328
SWITCH FOR SPLIT-BRAKE SYSTEM
Jack A. Smart, Owosso, Mich., assignor to Midland-Ross Corporation, Cleveland, Ohio, a corporation of Ohio
Filed May 19, 1966, Ser. No. 551,301
Int. Cl. B60t 17/22
U.S. Cl. 340—52       5 Claims

ABSTRACT OF THE DISCLOSURE

A pressure-responsive electrical switching device, essentially a signal-actuator, for use with two or more pressure systems connected therewith designed for operating indicating means in the event of any pressure transmitted thereto and to operate other electrical indicating means for warning of pressure failure in any one of the pressure systems.

---

The invention has particular utility in fluid-braking systems for automotive vehicles where a dual-chamber brake master cylinder is used, one chamber being used to operate one set of brakes of the vehicle and the other to operate a second set of brakes.

It is customary in most automotive vehicles adapted for highway travel to have means for signaling other vehicles to the rear when the brakes are being applied. Usually, this is done by means of warning lights mounted at the rear of the vehicle which are switched on whenever the brakes are actuated. The switching may be accomplished mechanically in response to travel of the brake pedal or, alternatively, in response to the fluid pressure in the brake system hydraulic lines which occurs when the brakes are applied.

For added safety, some newer automotive vehicles adapted for highway travel have two separate fluid-pressure systems for operating the brakes, one system being used for operating the rear wheel brakes and the other for operating the front wheel brakes. The brakes are typically actuated in this type of installation by a dual-chamber brake master cylinder. Accordingly, a failure in one fluid pressure system does not effect the operation of the other system and braking action will still be available.

It is essential in such dual systems that the brake light at the rear of the vehicle be switched on both during normal brake application and during operation of only front or rear wheel brakes alone.

Since braking action will be available even though one of the systems is inoperative, the driver of the vehicle may be unable to detect the failure (by vehicle behavior and response alone) when the brakes are applied. Consequently, it is desirable to have some means for detecting a failure in either one of the fluid pressure systems alone, and warning the driver of this condition.

While several conventional switching devices for warning of brake system failure are available, all have the common fault of being subject to malfunction due to the long period of nonuse which would normally be expected in the case of highway vehicles. For example, when the switch remains in a nonoperating condition for a long period of time, some corrosion of the switch contacts and accumulation of dust and dirt particles between moving parts of the switch are likely to occur and, consequently, render the system inoperative.

The device of the present invention satisfies all of the above objections and affords other advantages heretofore not obtainable.

According to the devices of the present invention, there is provided an electrical switch responsive to two isolated fluid pressures, which includes a first contact member movable in response to a first fluid pressure between a first position and a second position; and, a second contact member movable in response to a second fluid pressure between a first position and a second position. The first movable contact member is connected to a primary output terminal and a secondary output terminal, respectively connected to the brake lights, and to a brake failure warning light. When the first contact member is moved to its second position, it is connected to the primary output terminal and the input terminal for brake light actuation; the input terminal being connected to the electrical current source. This makes a connection to the brake light at the rear of the vehicle. The second contact member, when in its first position, also connects the primary output terminal to the secondary output terminal so that no signal is produced; and, when in its second position, also connects the primary output terminal to the input terminal to produce a signal. Accordingly, brake pressure in either or both fluid-pressure systems actuates either or both contact members respectively to switch on the brake lights of the vehicle. However, when a failure occurs in one of the fluid-pressure systems so that one of the contact members remains in its first position, current will be directed to the brake failure warning light so that this condition may be detected even though the brakes are being actuated and the brake warning lights are switched on.

As a particular advantage of the switching device of the invention, the switch contacts, which actuate the pressure failure warning lights, are actuated every time the brakes are applied. This provides added assurance that the brake failure warning light indicator will be switched on in the event that a pressure failure in one of the fluid-pressure systems should occur.

It is among the objects of the invention to provide an electrical switching device for switching on the brake lights of an automotive vehicle having a dual-chamber brake master cylinder; and, for switching a warning light or other indicator when a failure occurs in one fluid-pressure system operated by the master cylinder; the switch being responsive to fluid pressures of two isolated hydraulic systems.

Another object of the invention is to provide an electrical switching device effective to switch on the brake lights of an automotive vehicle in response to braking pressure in two fluid-pressure systems, one for actuating one set of brakes of the vehicle, and the other for actuating the other set of brakes of the vehicle, or in response to braking pressure in either one of the fluid-pressure systems alone.

A further object of the invention is to provide a means for signaling the operator of an automotive vehicle having a dual-chamber brake master cylinder whenever the brakes are applied and a failure occurs in one of the two fluid-pressure systems of the vehicle's braking system.

Still another object of the invention is to provide an emergency warning signal to the operator of an automotive vehicle whenever the brakes are applied and a fluid-pressure failure occurs in one of two fluid-pressure systems of the vehicle braking system; the switch contact of the device being actuated upon each application of braking pressure in all or part of these systems.

Other objects, uses, and advantages of the invention will become apparent from the following detailed description and drawings which depict a specific embodiment of the invention and are for the purpose of illustration rather than limitation, wherein like parts are indicated by like numerals and wherein;

FIG. 1 is an elevational view drawn to scale of a switching device embodying the invention;

FIG. 2 is an end-elevational view on an enlarged scale of the switching device of FIG. 1;

FIG. 3 is a sectional view taken on the lines 3—3 of FIG. 2;

FIG. 4 is an end-elevational view of the electrical device of FIG. 1 on an enlarged scale showing the end opposite to that shown in FIG. 2 with parts broken away and shown in section;

FIG. 5 is a fragmentary, schematic, sectional view taken as on the lines 3—3 of FIG. 2, showing the switch in its normal actuated position responsive to operating pressures in two separate fluid-pressure systems, the terminal and stationary contacts being shown schematically for ease of understanding;

FIG. 6 is a fragmentary, schematic, sectional view taken as on the lines 3—3 of FIG. 2, showing the switch in its failure signaling condition where operating pressure exists in the separate fluid-pressure systems at the right-hand side of the view and a pressure failure exists in the separate fluid-pressure systems communicating from the switch at the left-hand side; and, FIG. 7 is a schematic circuit diagram of a typical electrical indicator and warning system using a pressure-responsive switch according to the present invention.

Referring more particularly to the drawings, there is shown a three terminal fluid-pressure responsive electrical switch A embodying the invention. The switch A comprises a rigid casing 10, preferably formed of a readily machinable metal and comprising an open-ended cup-like body portion and a removable plug 12 which define a cylindrical cavity 11. The right-hand end of the cavity 11, as viewed in FIG. 3, is threaded and receives the threaded end plug 12. Formed in the side walls of the casing 10 and spaced approximately 90° from one another are two longitudinal slots 13 and 14 extending a major portion of the depth of the cavity 11.

Mounted within the cavity 11 is a contact assembly broadly indicated by the numeral 15. The contact assembly 15 includes a housing 16 formed of a suitable dielectric material such as a phenolic resin to provide the necessary electrical insulating characteristics and three terminals including an input terminal 17, a primary output terminal 18, and a secondary output terminal 19. The terminals 17 and 19 extend through an insulating boss 20 formed in the housing 16; the boss 20 being received in the slot 13 of the casing 10. The terminal 18 extends through an insulating boss 21 formed in the housing 16; the boss 21 being received in the slot 14. As the drawing shows, all three terminals have portions disposed outside the switch casing 10 adapting the switch for quick connection with circuit wires, etc.

Clamped in sealing relation between the end plug 12 and the housing 16 is a flexible diaphragm 25 which defines with the inner face of the end plug 12, a space 26. The space 26 communicates by means of a longitudinal passage 27 with threaded female receptacle 28 which receives a male fitting from a fluid-pressure system. The space 26 also communicates by means of another longitudinal passage 29 with another threaded female receptacle 30 which receives a male fitting of the same fluid-pressure system.

Clamped in sealing engagement between the closed end of the cavity 11 and the housing 16 is another flexible diaphragm 35 which defines with the end of the cavity 11, a space 36. The space 36 communicates by means of passages 37, 38 and 39 with three threaded female receptacles 40, 41 and 42, formed in the casing 10 and which receive male fittings of a second-fluid pressure system. As FIGS. 3, 5, and 6 plainly show, the assembly of various removable internal parts of the switch including the diaphragms 25, 35 and the housing 16 are clamped within the cavity 11 by the plug 12.

The diaphragms 25 and 35 are substantially identical and have an enlarged cylindrical central portion 43 which serves as a plunger and which moves axially inward in response to a predetermined fluid-pressure condition in the adjacent space 26 or 36. A typical braking pressure in a fluid braking system for a passenger vehicle would be around 50 p.s.i. or higher.

Located adjacent to each of the diaphragms 25 and 35 is a steel retainer washer 44. This is faced with a suitable dielectric material 44a. Mounted adjacent to the enlarged portion of each diaphragm 25 and 35, are movable contact members or discs 45 and 46, which define with the housing 16 closed chambers 47 and 48. The contact members 45 and 46 are adapted for reciprocating movement in the chambers 47 and 48 in response to movement of the adjacent diaphragm 25 or 35 and are biased against the enlarged portions 43 of the diaphragms by springs 49 and 50 which bear outwardly against the wall of the appropriate chamber 47 or 48.

Located on the opposite sides of the chamber 47, adjacent to the washer 44-44a, are stationary contacts 51 and 52; the contact 51 being connected to the secondary output terminal 19, behind terminal 17 in FIG. 3; and the contact 52 being connected to the primary output terminal 18. Also located within the chamber 47 are two stationary contacts 53 and 54; the stationary contact 53 being connected to the input terminal 17 and the stationary contact 54 being connected to the primary output terminal 18.

Located on opposite sides of chamber 48, adjacent to the left-hand washer 44-44a, are stationary contacts 55 and 56; the contact 56 being connected to the secondary output terminal 19, hidden behind input terminal 17 in FIG. 3; and the contact 55 being connected to the primary output terminal 18. Also located within the chamber 48 are two stationary contacts 57 and 58; the stationary contact 57 being connected to the input terminal 17 and the stationary contact 58 being connected to the primary output terminal 18.

Movable contact members 45 and 46 are biased into engagement with stationary contacts 51 and 52 on the one hand and 55 and 56 on the other hand so that no electrical current is directed to the output terminals 18 and 19 when the fluid in the spaces 26 and 36 is in a low-pressure condition. Normally, the residual pressure in the fluid system of a brake installation for a passenger vehicle is around 8 to 10 p.s.i.

When the movable contact members 45 and 46 are moved inwardly into engagement with the stationary contacts 53 and 54 on the one hand and 57 and 58 on the other, due to a high fluid pressure in the spaces 26 and 36, the input terminal 17 is connected to the primary output terminal 18 to energize the primary output terminal 18 and actuate the brake warning lights of the vehicle. This condition is best shown in FIG. 5.

When pressure in one of the fluid-pressure systems fails during actuation of the fluid system, however, one of the movable contact members 45 or 46 will be moved inward due to fluid pressure and the other will remain in its normal condition. This condition is best shown in FIG. 6.

It will be seen in FIG. 6 that the pressure in the space 36 is insufficient to force the flexible diaphragm 35 inwardly against the coil spring 50 while the pressure in the space 26 is high enough to force the flexible diaphragm 25 inwardly against the coil spring 49 so that movable contact member 46 connects primary output terminal 18 to secondary output terminal 19 and movable contact member 45 engages stationary contacts 53 and 54 to connect the input terminal 17 to the primary output terminal 18.

However, since the primary output terminal 18 is also connected at the same time to the secondary output terminal 19 by contact 46, both the primary and secondary circuits are energized to actuate electrically operated devices such as brake warning light 60 and a brake failure indicator light 61 on the driver's console, FIG. 7.

OPERATION

The operation of the switch A when used in connection with an automotive vehicle brake installation having two separate brake systems operated by a dual-chamber brake master cylinder, may be best understood with reference to FIGS. 5, 6 and 7.

With the switch operative, connected in a vehicle, the input terminal 17 is connected to a suitable source of electrical current, such as the vehicle battey and the primary output terminal 18 and the secondary output terminal 19 are connected to a brake warning light circuit 60a and a brake failure indicator circuit 61a, respectively.

When the brakes are applied with both fluid systems operative, the switch A will function in the manner shown in FIG. 5. It will be seen that the flexible diaphragms 25 and 35 have been forced inwardly by the fluid pressure in the spaces 26 and 36 to move the movable contact members 45 and 46 into engagement with stationary contacts 53 and 54 and 57 and 58, respectively, to connect the input terminal 17 to the primary output terminal 18 and actuate the brake warning light circuit 60a. In this condition, the secondary output terminal 19 is not connected to any current source so that the brake failure indicator circuit 61a is not energized.

When a fluid pressure failure occurs in one of the systems of the brake installation, such as one of the lines which communicates with the space 36 at the left-hand side of the switch A as viewed in the drawings, that system will not be pressurized upon application of the brakes and the brake master cylinder will serve to provide braking pressure only in the other fluid-pressure system communicating with the space 26.

Referring to FIG. 6, it will be seen that the flexible diaphragm 35 is not effected by the application of the brake and the movable contact member 46 remains in its spring biased condition in engagement with stationary contacts 55 and 56 to connect primary output terminal 18 with secondary output terminal 19.

However, fluid pressure in the other system forces the flexible diaphragm 25 inwardly to move the movable contact member 45 into engagement with stationary contacts 53 and 54 to connect the input terminal 17 with the primary output terminal 18 and thus energize the brake warning light circuit 60a.

Since the primary output terminal 18 is also connected to the secondary output terminal 19, the brake pressure failure indicator circuit 61a is also energized to actuate the brake pressure failure indicator light 61.

In the extended scope of the invention, the springs 49 and 50 could be selected to balance a residual pressure in chambers 26 and 36. This would suspend the movable contacts 45 and 46 between the two sets of fixed contacts. Upon failure of residual pressure, the diaphragms 25 and 35 would then be spring moved to actuate a warning light in an independent warning light circuit. In other respects, the switch would function as disclosed.

I claim:

1. An electrical switching device responsive to two isolated fluid system pressures comprising:
   a first contact member movable in response to a first fluid system pressure between a first position and a second position;
   a second contact member movable in response to a second fluid system pressure between a first position and a second position;
   a primary output terminal;
   a secondary output terminal;
   an input terminal;
   said terminals and contact members being constructed and arranged to enable each contact member to independently contact a portion of said primary output terminal and a portion of said secondary output terminal when in its first position and a portion of said primary output terminal and a portion of said input terminal in its second position;
   a casing for substantially enclosing said members and said terminals, and having means for separate connection with two sources of fluid pressure and communicating each source with a contact member;
   said casing comprising a cup-like body portion having an open end, and a removable plug disposed for closing the open end of the body portion defining a cavity within the casing for receiving said terminals and said contact members.

2. The switching device of claim 1 comprising:
   a housing receivable in said cavity for supporting said contact members and said terminals.

3. The switching device, as defined in claim 1, wherein:
   said three terminals have portions disposed outwardly of the casing adapting the device for connection within electrical circuits.

4. In a fluid-pressure responsive electrical switching device:
   a casing having two sealed fluid-pressure spaces;
   a contact member movable within each chamber in response to increases in pressure transmitted to the respective associated chamber between a low-pressure position and a high-pressure position;
   a high-pressure indicating circuit including a contact within said casing engageable by each contact member at its low-pressure position;
   a low-pressure warning circuit including a contact within said casing engageable by each contact member at is low-preessure position;
   an energizing circuit including a contact within said casing engageable by each contact member at its high-pressure position; and
   a contact in said high-pressure indicator circuit within said casing engageable by each contact member at its high-pressure position;
   each contact member connecting said high-pressure indicator circuit to said low-pressure warning circuit when in its low-pressure condition, and connecting said high-pressure indicator circuit to said energizing circuit when in its high-pressure condition;
   contacts of said contacts on the same circuit being electrically connected within the casing and extending therefrom to externally of the casing as a single terminal thereby providing a primary output terminal, a secondary output terminal, and an input terminal as external electrical termini of said device.

5. The switching device of claim 4 wherein:
   said casing comprises an open-end cup-shaped body portion and a plug within its open end in threaded relation with the body portion defining a cavity for the casing;
   said device comprising an assembly of terminals providing said contacts, said contact members and internal supporting means therefor, and a pair of resilient diaphragms in engagement with said members for sealing said spaces and moving said members;
   said plug adjustably engaging said assembly to clamp said assembly between it and the closed end of said cavity.

References Cited

UNITED STATES PATENTS

| | | | |
|---|---|---|---|
| 2,938,976 | 5/1960 | Wilson | 200—82 |
| 3,077,524 | 2/1963 | Blackburn | 200—82 |
| 3,148,364 | 9/1964 | Engels et al. | |
| 3,423,727 | 1/1969 | Adamson | 340—60 |

DONALD J. YUSKO, Primary Examiner

H. S. COHEN, Assistant Examiner

U.S. Cl. X.R.

200—81.4; 340—60, 69